F. E. SPERRY.
CHANGE SPEED GEARING.
APPLICATION FILED AUG. 26, 1912.
1,070,634.
Patented Aug. 19, 1913.
5 SHEETS—SHEET 1.
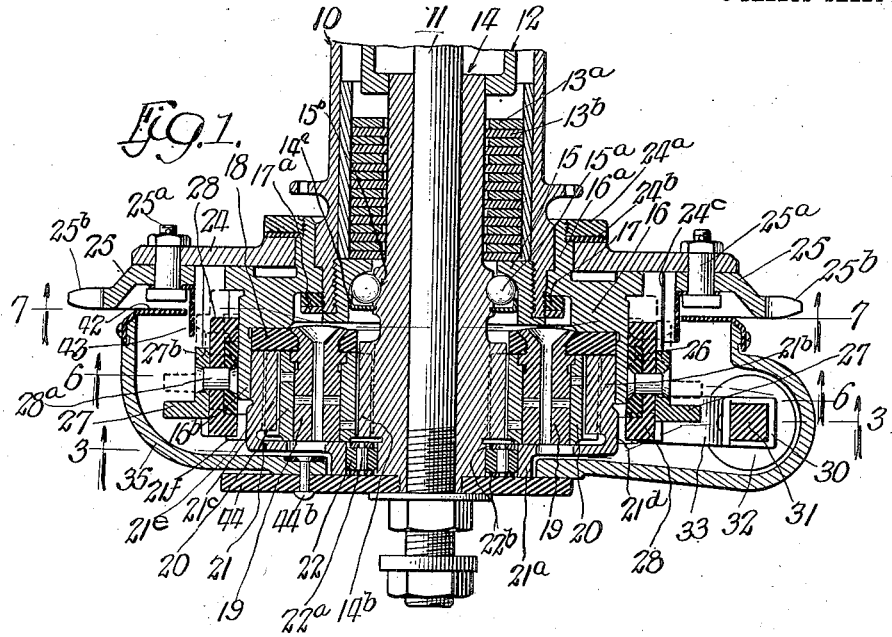
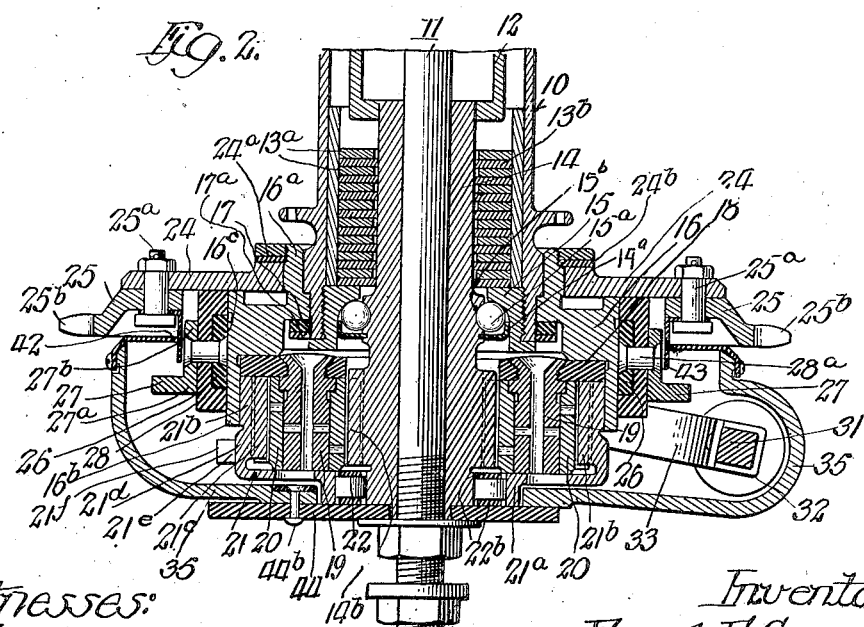
Witnesses:
Inventor
Frank E. Sperry
By Poole & Crower Att'ys

F. E. SPERRY.
CHANGE SPEED GEARING.
APPLICATION FILED AUG. 26, 1912.

1,070,634.

Patented Aug. 19, 1913.
5 SHEETS—SHEET 2.

Witnesses:

Inventor
Frank E. Sperry
by Poole & Crowner Attys

F. E. SPERRY.
CHANGE SPEED GEARING.
APPLICATION FILED AUG. 26, 1912.
1,070,634.
Patented Aug. 19, 1913.
5 SHEETS—SHEET 3.
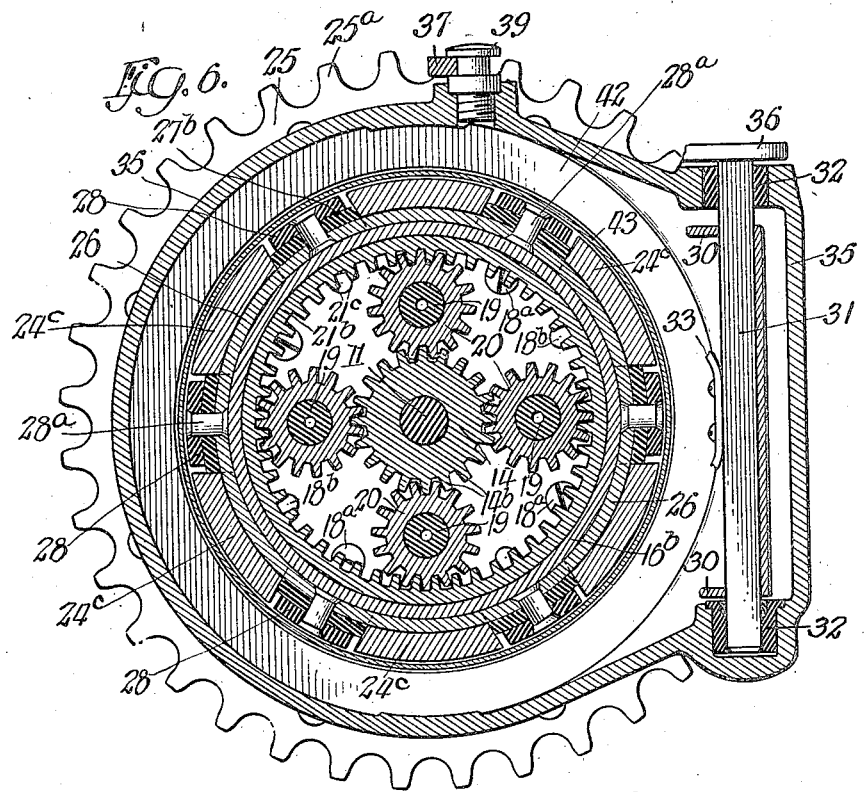
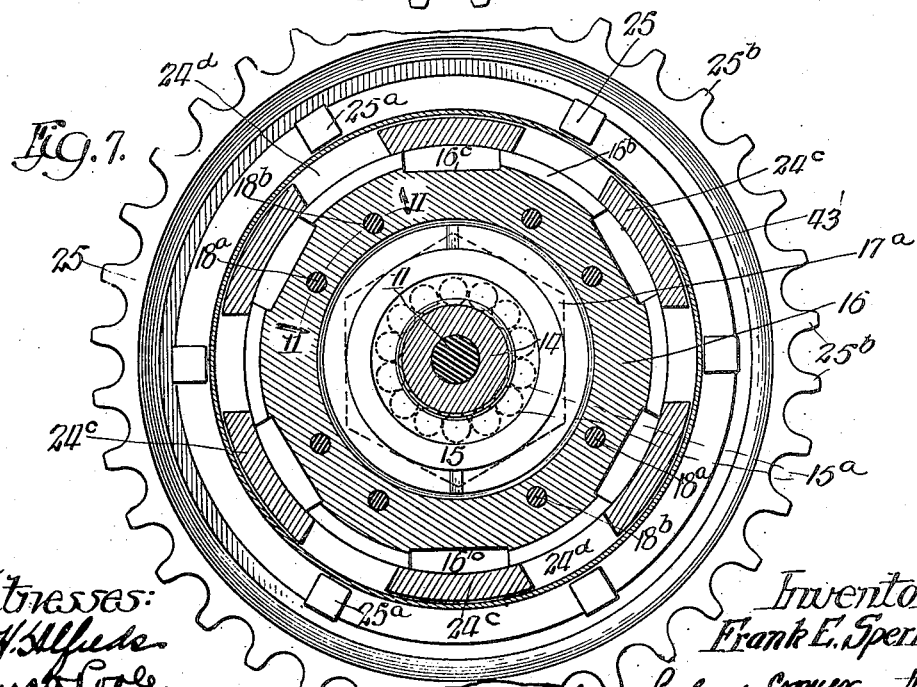
Witnesses:
T. H. Alfred
Chas. A. Poole
Inventor
Frank E. Sperry
by Poole & Crouer Attys

F. E. SPERRY.
CHANGE SPEED GEARING.
APPLICATION FILED AUG. 26, 1912.

1,070,634.

Patented Aug. 19, 1913.
5 SHEETS—SHEET 4.

Witnesses:

Inventor
Frank E. Sperry
by Poole + Cromer Attys

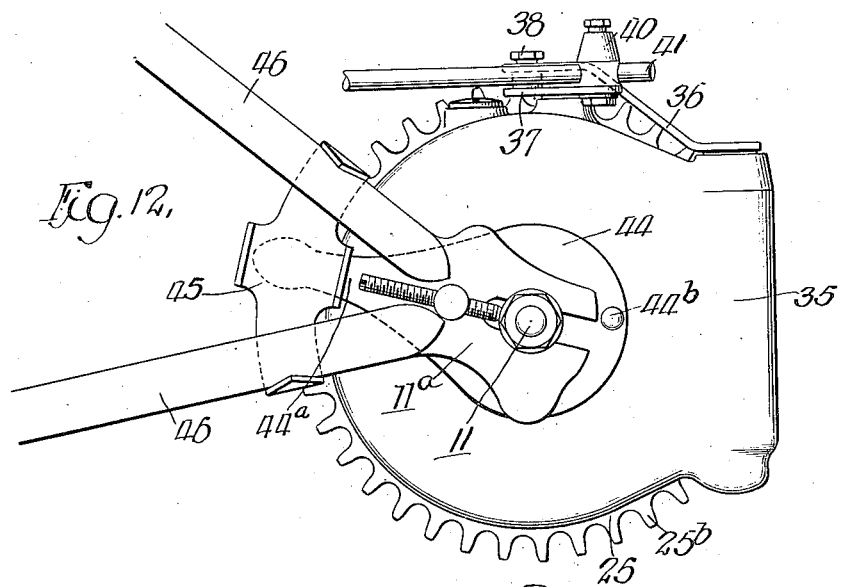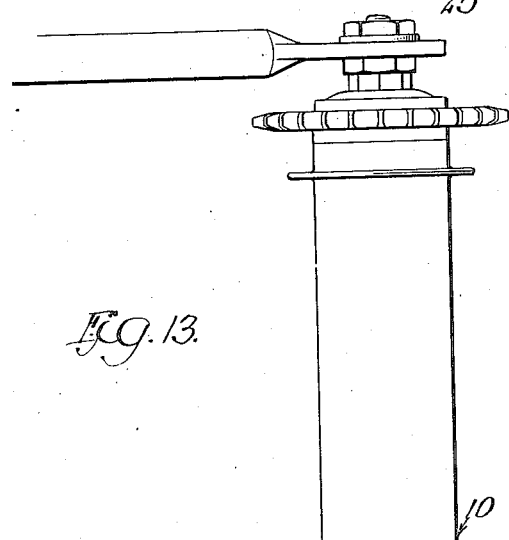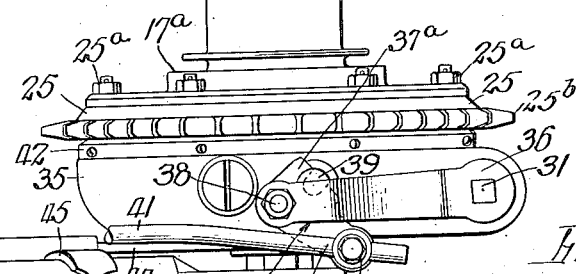

ns in - position to drive at the high speed;
UNITED STATES PATENT OFFICE.

FRANK E. SPERRY, OF AURORA, ILLINOIS, ASSIGNOR TO AURORA AUTOMATIC MACHINERY COMPANY, OF CHICAGO, ILLINOIS, A CORPORATION OF ILLINOIS.

CHANGE-SPEED GEARING.

1,070,634.  Specification of Letters Patent.  Patented Aug. 19, 1913.

Application filed August 26, 1912. Serial No. 717,109.

*To all whom it may concern:*

Be it known that I, FRANK E. SPERRY, a citizen of the United States, and a resident of Aurora, in the county of Kane and State of Illinois, have invented certain new and useful Improvements in Change-Speed Gearing; and I do hereby declare that the following is a full, clear, and exact description thereof, reference being had to the accompanying drawings, and to the letters of reference marked thereon, which form a part of this specification.

This invention relates to improvements in change speed power transmission devices and more particularly to improvements in that class of change speed devices wherein planetary gearing is employed as a means of obtaining the desired change of speed and which are applicable for use on motor vehicles and particularly upon motor cycles.

The invention is herein described and shown in the accompanying drawings as embodied in a change speed device that is mounted upon the rear axle of a motor cycle and in connection or association with a coaster brake of a motor cycle.

The invention consists in the matters herein described and more particularly pointed out in the appended claims.

Figure 3:
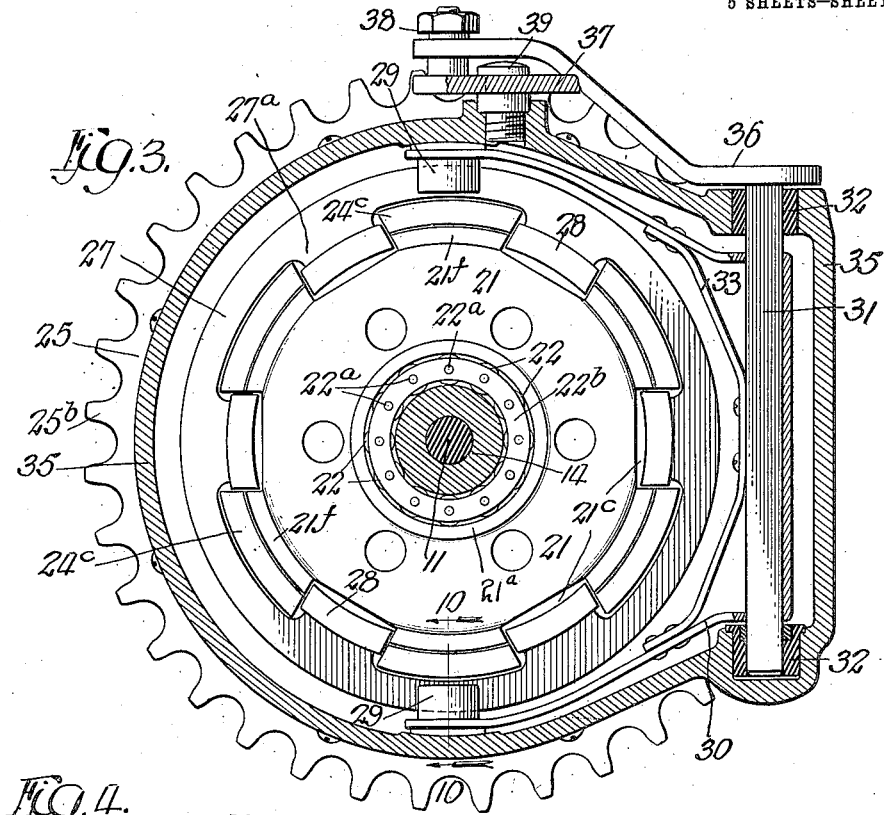
Figure 4:
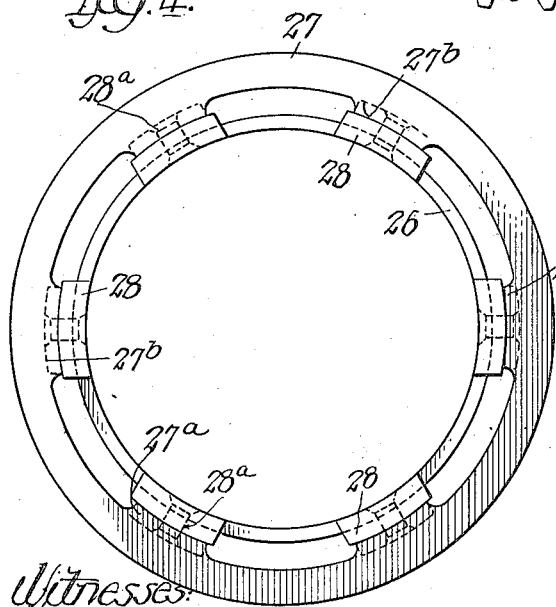
Figure 5:
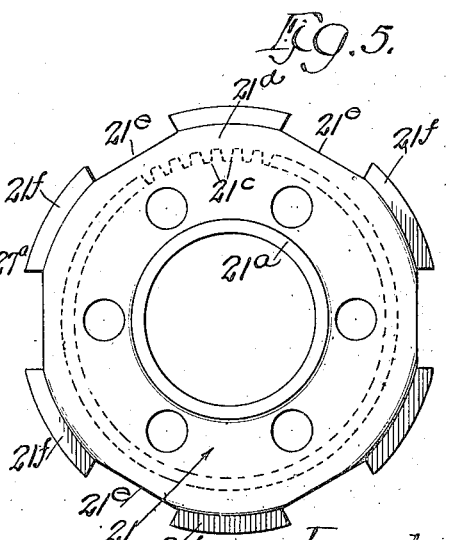
Figure 8:
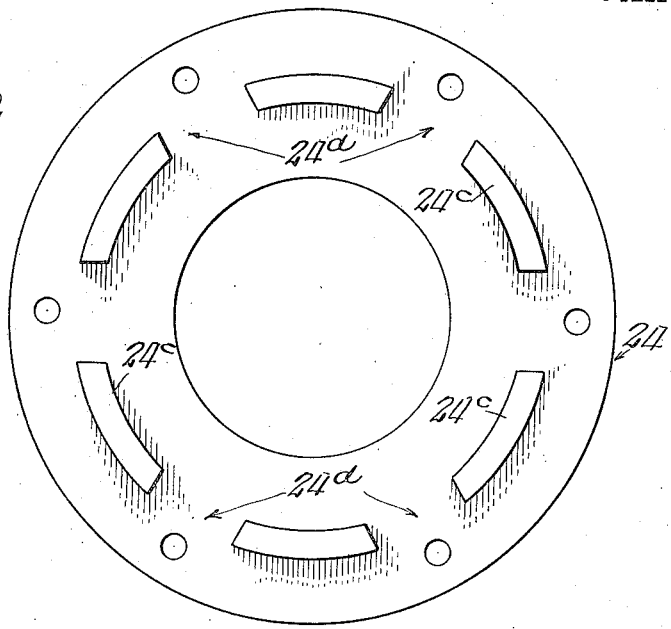
Figure 9:
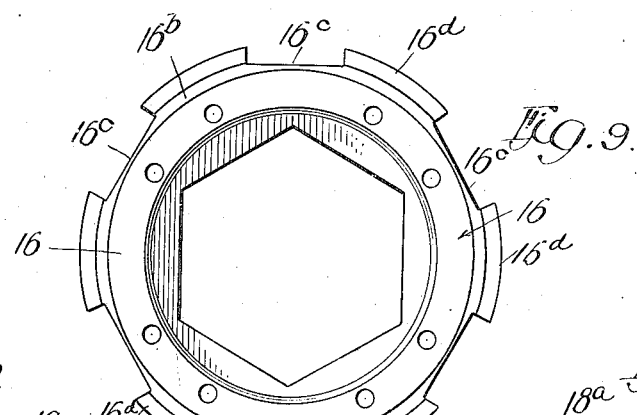
Figure 10:
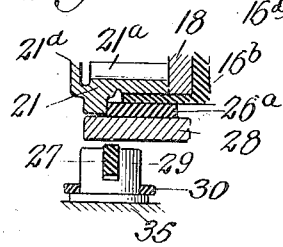
Figure 11:
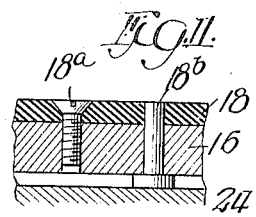

In the drawings, Figure 1 is a view in longitudinal cross section of the change speed gearing, showing its members in position to actuate the part to be driven at the slow speed; Fig. 2 is a sectional view like Fig. 1, showing the members of the device in position to drive at the high speed; Fig. 3 is a view in cross section, taken on line 3—3 of Fig. 1; Fig. 4 is a view in front elevation of the shifting clutch ring separate from the other parts; Fig. 5 is a view in front elevation of the gear wheel or intermediate driven member, separate from the other parts; Fig. 6 is a sectional view taken on line 6—6 of Fig. 1; Fig. 7 is a sectional view taken on line 7—7 of Fig. 1; Fig. 8 is a view in front elevation of the central part or disk of the sprocket wheel; Fig. 9 is a view in front elevation of the central body support, constituting a part of the primary driven member; Fig. 10 is a sectional view taken on line 10—10 of Fig. 3; Fig. 11 is a sectional view taken on line 11—11 of Fig. 7; Fig. 12 is a view in side elevation of the complete device showing the same mounted on the vehicle frame, and a portion of the controlling rod; Fig. 13 is a plan view of the same.

In the form of a change speed device shown in the accompanying drawings, the same embraces as its principal parts a non-rotative bearing member, a primary driven member, a driving member, and a clutch mechanism adapted to lock the driving member to either the primary or intermediate driven member. As illustrated in said drawings, the non-rotative bearing member embraces an axle 11, and a tubular member or sleeve 14 surrounding one end of said axle, and provided with external gear teeth $14^b$. The axle 11 and sleeve 14 are rigidly affixed to the frame of the vehicle. The axle 11 shown is the rear axle of a motor cycle and is adapted for attachment to the frame member $11^a$ of such a motor cycle, in a familiar manner, as shown in Figs. 12 and 14. The primary driven member is adapted to turn or rotate on the said non-rotative bearing member and embraces a tubular part or hub shell 10, an annular body member 16, which surrounds and is rigidly attached to one end of said hub shell, and a stud-carrying ring 18 rigidly attached to the body member 16 concentrically with same. Said ring 18 is provided with a plurality of rigidly attached studs 19, 19 extending from the outer side of said ring parallel with the central axis of the device, and carrying a plurality of pinions 20, 20, which intermesh with the gear teeth $14^b$ on the sleeve 14. The hub shell 10, one end only of which is shown, constitutes the rear hub of a motor cycle, to which the wheel spokes are attached. Said hub shell is mounted concentrically with the axle 11, and is supported at its opposite ends by suitable bearings. In the drawings, one only of such bearings is shown, the same being located between the end of the hub shell 10 and the sleeve 14, as hereinafter more particularly described.

The intermediate driven member consists of a gear-wheel 21, having a hub $21^a$, which is mounted and turns on the fixed sleeve 14 outside of the teeth thereon, and the rim of which has the form of a cylindric ring 21$^b$, which extends toward the body member 16 and surrounds the gear pinions 20, 20. Said gear wheel 21 is provided with internal gear teeth 21$^c$ formed on the inner face of the ring 21$^b$ and engaging the said pinions 20, 20.

The driving member consists of an annular member or apertured disk 24 which is mounted and is adapted to turn upon the body member 16 and has attached to its outer margin a ring 25 provided with a series of sprocket teeth 25$^b$, the parts 24 and 25 together forming a sprocket wheel. Said sprocket wheel is adapted to receive a sprocket chain (not shown) by which the rotary motion is transmitted from an engine or motor to the driving member.

The body member 16 is provided with an annular cylindric flange 16$^b$, which extends outwardly therefrom and surrounds the inner part of the ring 21$^b$ of the gear-wheel 21.

The clutch mechanism embraces, in general, features of construction as follows: The annular body member 16 is provided with an outwardly extending peripheral flange 16$^b$, located adjacent to the inner face of said body member, or at the side of the same nearest the hub shell 10, and also adjacent to the sprocket wheel or driving member 24. Said flange 16$^b$ is provided with a series of notches 16$^c$ (Fig. 9), forming a plurality of radially extending lugs or locking projections 16$^d$. The intermediate driven member or gear wheel 21 is provided on the outer surface of its cylindric rim or gear-ring 21$^b$, with an outwardly extending, annular flange 21$^d$ (Fig. 5) provided with a plurality of notches 21$^e$ forming a series of radial projections or locking teeth 21$^f$, located at the outer margin of the ring 21$^b$, and exterior to the outer margin of the annular flange 16$^b$ on the body member 16. The driving member, or sprocket wheel 24, is provided on its outer face with an annularly arranged set or series of segmental arms 24$^c$ (Fig. 8), which extend laterally therefrom radially outside of the body member 16 and the gear wheel 21. Said arms 24$^c$ are spaced radially from the cylindric outer face of the body member 16 and its annular flange 16$^b$, and are adapted to form between them a series of guide slots 24$^d$, extending longitudinally of, or parallel with the central axis of the device. In addition to the parts described, the clutch mechanism embraces an axially movable or sliding clutch ring 26, which surrounds and slides laterally on the cylindric outer surface of the body member 16 and its flange 16$^b$, and is located in the space between said body member and the segmental arms 24$^c$ of the sprocket wheel 24. The device shown for giving sliding movement to or actuating said clutch ring will be hereinafter described. Said clutch ring 26 carries a series of keys, 28, 28, which are attached to and move with said clutch ring. Said keys are fitted between the arms 24$^c$, 24$^c$, of the sprocket wheel 24, and slide in the slots 24$^d$, between said arms, in the direction of the central axis of the device. The inner ends of said keys are adapted to enter the notches 16$^c$ and to thereby engage the locking keys or teeth 16$^d$ on the body member 16 of the primary driven member. The outer or forward ends of the said keys are adapted to enter the notches 21$^e$, and to thereby engage the locking lugs or teeth 21$^f$ on the gear wheel or intermediate driven member 21; the keys 28, 28, being constantly engaged between or with the arms 24$^c$ on the sprocket wheel 24. The said keys, together with the clutch ring 26 turn or rotate with said sprocket wheel, and when said clutch ring and the keys are shifted, the keys act to connect or lock the said sprocket wheel either to the body 16 of the primary driven member, or to the gear wheel 21, constituting the intermediate driven member. When the said sprocket wheel 24 is locked to the body member, the hub 10, and the wheel of the vehicle are locked to and turn with the said sprocket wheel. When the said sprocket wheel is released from the body member 16, and locked to the gear wheel 21, the latter turns with the sprocket wheel, and by reason of its geared connection with the pinions 20, 20, and the geared connection of said pinions with the non-rotative sleeve 14, said pinions are carried bodily around the said sleeve 14, thereby effecting rotative movement of the body member on which said pinions are mounted. The body member and hub are then rotated at a rate of speed slower than that of the sprocket wheel, with a corresponding increase in the turning moment transmitted to the wheel hub and the vehicle wheel.

Now referring more in detail to the construction shown in the several parts described, and to the means for operating the clutch mechanism, the same embrace features of construction as follows: Said hub shell 10 is provided in its end with a bearing ring 15 forming a ball race and adapted for contact with a plurality of annularly arranged balls 15$^a$ of an anti-friction ball bearing. Said balls travel in a ball race or groove 15$^b$ in the non-rotative sleeve 14 and are held therein by means of a flanged retaining ring 14$^a$. Within the hub shell 10 and upon the fixed sleeve 14 are mounted the movable and stationary brake-disks 13$^a$ and 13$^b$ and endwise movable member 12 of a coaster brake-disk, which, having no relation to the present invention, will not again be referred to. The annular body member 16 (Fig. 1) is provided with a central hexagonal opening (Fig. 9) and fits upon a correspondingly shaped seat formed on the hub shell 10; the said body member being held or clamped against a shoulder formed in the hub shell by means of an internally threaded collar 17 and a check nut 17ª applied to the screw threaded end of said shell. The body member 16 is provided with an attached sleeve or hub 16ª which extends inwardly from the body member over the adjacent part of the hub shell which latter is thickened to form the said shoulder. The said annular flange 16ª forms a cylindric bearing for the disk 24 forming the body of the driving member which bears against the inner face of said body member and is held on the body member by means of a ring 24ª having screw threaded engagement with the hub 16ª. A washer 24ᵇ of compressible material is interposed between the disk 24 and the ring 24ª, and acts to afford a frictional or yielding connection between said parts, affording a slight degree of resistance to the turning of the said sprocket wheel or driving member relatively to the primary driven member. The ring 25 provided with the sprocket teeth 25ᵇ is detachably secured to the disk 24 by means of bolts 25ª, enabling said ring to be removed and replaced by a ring of larger or smaller external diameter, when desired. The rear face of the annular flange 16ᵇ (Fig. 9) on the body member 16, on which are formed the clutch teeth 16ᵈ, forms an annular bearing face against which rests or bears the central body part or disk 24 of the sprocket wheel or driving member. The stud-bearing ring 18 is rigidly attached to the body member 16 adjacent to and within the flange 16ᵇ thereof by means of screws 18ª and dowel pins 18ᵇ (Fig. 11). The radial width of such ring is such that it extends inwardly past the adjacent end of the hub shell 10, and closely surrounds the fixed sleeve 14 adjacent to the inner ends of the gear teeth 14ᵇ on the said sleeve. The bearing studs 19, 19 for the pinions 20, 20 are secured in said ring 18 near its inner edge, and the cylindric rim 21ᵇ of the gear wheel 21, which extends within the said flange 16ᵇ, has its inner edge closely adjacent to or in bearing engagement with the outer face of the stud plate 18 exterior to said pinions. Said gear wheel 21 is supported on the outer end of the sleeve 14 through the medium of a roller bearing consisting of a plurality of cylindric rollers 22, mounted on bearing pins 22ª, which extend between caging rings 22ᵇ. Said rollers 22 have contact with a cylindric bearing surface formed on the stationary sleeve 14 exterior to the gear teeth 14ᵇ. The clutch ring 26 (Fig. 4) with which the keys 28 are connected has attached to it an outer ring 27 which surrounds the arms 24ᶜ. The outer clutch ring has its inner surface spaced from the outer surface of the arms 24ᶜ and is provided with a plurality of inwardly extending lugs 27ª, corresponding in location with the keys 28, and extending inwardly into contact with said keys. Said lugs 27ª are extended at right angles with the side faces of the ring 27 to form a series of arms 27ᵇ, arranged parallel with said keys 28 and in contact with the outer faces of said keys. Each of said keys 28 is provided in its inner face with a notch of a depth and width sufficient to receive the inner clutch ring 26 so that the interior surfaces of said keys 28 and the inner ring 26 are flush with each other, as seen in Figs. 1 and 2. The inner ring 26 and the outer ring 27 are rigidly held together by means of radially arranged rivets 28ª passing through the inner ring 26, the keys 28, and the lugs 27ª on said outer ring 27. By this construction the clutch ring 26 is adapted to slide between the flange 16ᵇ of the body member 16 and the arms 24ᶜ on the sprocket wheel member 24, while the keys 28 rest in the slots between said arms 24ᶜ, and the outer ring 27 is exterior to and free from contact with said arms 24ᶜ, as clearly seen in Fig. 3. The keys 28 project at their ends from the clutch ring 26 and outer ring 27 toward the disk 24 and are adapted, when the clutch ring is shifted inwardly, to enter or engage the notches 16ᶜ between the lugs or teeth 16ᵈ on the body member 16. The outer projecting ends of the keys 28 extend laterally from said rings 26 and 27 and are adapted to engage the notches 21ᵉ of the gear wheel 21, when said rings 26 and 27 are shifted outwardly on or relatively to the arms 24ᶜ. The shifting movement of said clutch rings 26 and 27 is accomplished by means of shifter blocks 29 (Fig. 3) arranged diametrically opposite each other and which straddle the outer ring 27 of the two clutch rings in the manner shown in Fig. 10. Said shifter blocks 29 are rigidly attached to a shifter yoke 30 (Figs. 3 and 6). Said shifter yoke is rigidly attached to a square shaft 31 extending at right angles to the central axis of the device and pivoted at its ends in fixed bearings 32, 32. Said shifter yoke is additionally supported by means of a brace 33 riveted at either extremity to the shifter yoke 30 and at its central portion to the pivot shaft 31. To the upper extremity of said pivot shaft 31 is rigidly attached a lever arm 36, the swinging end of which is pivotally connected with an auxiliary lever 37 (Figs. 12 and 13), by means of a bolt 38. Said auxiliary lever is provided with a short and a long arm extending at right angles to each other from the connecting bolt 38. The shorter arm 37ª engages a stationary pivot 39 by means of a semicircular notch in said shorter arm 37ª. At the extremity of the longer arm 37ᵇ of the auxiliary lever 37 is located a clamp 40 adapted to hold an operating rod 41, by means of which the power is conveyed to operate the clutch mechanism.

The entire mechanism, with the exception of the driving member or sprocket wheel and the operating levers for the clutch ring, is inclosed within a metallic housing 35, having a vertical front or outer wall arranged parallel with and outside of the gear wheel 21, and a marginal wall which extends inwardly to the outer face of the sprocket ring 25, and so constructed as to be oil and dust proof. The mechanism is protected by dust rings 42 and 43 (Figs. 1 and 2), one of which, the outer dust ring 42, is attached to the inner margin of the housing 35 and extends radially inward therefrom and substantially meets the flange and an inner dust ring 43 mounted upon the sprocket ring 25 by means of the bolts 25ª.

The non-rotative sleeve 14 is held from rotating by means of a vertical plate provided centrally with a flat sided hole adapted to engage a square shoulder formed upon the outer end of the said sleeve 14, thus preventing the rotation of said sleeve relative to the said plate 44. Said plate 44 is provided with a radially extending arm 44ª engaging at its outer end a yoke 45, rigidly attached to and extending between the frame members 46, 46 of the vehicle, and by means of which the plate 44 is restrained from rotation. The front wall of the casing 35 is rigidly attached by rivets 44ᵇ to said plate 44.

In describing the operation of this device, it may be first assumed that a constant power is being applied to the driving member or sprocket ring 25 from the vehicle motor, through the medium of a sprocket chain, thereby rotating the sprocket at a uniform speed. Furthermore it is assumed that there is a manually operable means provided upon the vehicle whereby motion may be transmitted through the operating rod 41 to give the clutch ring the necessary lateral shifting movement. To drive at the low speed the clutch ring 26 is shifted to the position shown in Fig. 1, in which position the keys 28 of the said clutch ring engage both the slots between the arm 24ᶜ of the sprocket support 24 and the teeth 21ᶠ of the gear wheel or intermediate driven member 21. At this time said keys are disengaged from the clutch teeth 16ᵈ of the primary driven member 16. The clutch ring therefore acts to lock the intermediate driven member to the sprocket wheel or driving member so that they rotate together. The internal gear of the intermediate driven member, meshing with the pinions, gives said pinions rotation about their shafts and also, since said pinions mesh with the gear teeth 14ᵇ of the non-rotating sleeve 14, the pinions are forced to rotate about the said non-rotative bearing member 14. The pinion studs 19, the stud bearing plate 18, and the central body support 16, being rigid with the hub shell 10, the rotative motion of the pinions about the non-rotative bearing member 14 is transmitted directly to the said hub shell 10 and thence to the vehicle wheel. If it is desired to change from the low to the high speed, it is necessary to disengage the intermediate driven member from the driving member and to lock the primary driven member directly to the driving member, and by so doing transmit rotative motion directly from the driving member to the hub shell 10. This is done by shifting the clutch ring to its outer extreme position, as shown in Fig. 2. The change of speed, however, does not take place immediately, for during the initial movement of the clutch ring the keys of the clutch ring are disengaged from the locking teeth of the intermediate driven member. The clutch ring and its keys are then brought to a neutral position, in which no power is transmitted, because the driving member and the driven members are disconnected. When the locking teeth of the intermediate driven member are disengaged from the keys there takes place a relative rotation between the sprocket member and the primary driven member which brings the locking notches of the latter opposite the clutch teeth of said driven member. The shifting power exerted upon the clutch ring being constant the keys of said clutch ring will slip into the oppositely arranged slots and notches, thus clutching the primary driven member to the driving member and a direct transmission of power will then be effected from the driving member to the primary driven member.

The general construction and arrangement of the parts in the change speed device described and shown is such that the parts constituting the planetary gearing, to wit, the non-rotative gear wheel, the rotative gear wheel, and the intermediate pinions, are located at one side of the main driven member which carries said pinions, that the said primary driven and intermediate driven members are provided with peripheral clutch teeth, and that the shifting clutch member and also the part of it upon the driving member with which said clutch member is engaged, surrounds or is arranged radially exterior to the said primary and intermediate driven members. As a result of this arrangement of the parts, the device as a whole occupies a minimum of space, or is made exceedingly compact in the direction of the axis of rotation of the parts. The result stated also arises to a large degree from the employment of the cylindric flange on the primary driven member arranged to extend over or around the intermediate driven member, so as to form an annular bearing surface for the clutch ring.

The general advantages of this device applied to a motor vehicle and particularly to a motor cycle are two in number, namely, the ability of easily changing from a high to a low or a low to a high speed without changing the operative conditions of the motor, and the ability to increase or decrease the driving power of the vehicle by means independent of the motor. The latter advantage is perhaps the most important, for occasions frequently occur, as in the case of driving the vehicle through sand or mud, where increased power and low speed are necessary. The relative arrangement of the parts, whereby the members constituting the clutch mechanism are arranged radially exterior to or surround the parts constituting the planetary gearing, has the important advantage of affording a change speed device occupying a narrow space laterally or in the direction of the central axis of the rotative parts, this being a feature of importance in the construction of motorcycles, wherein lateral compactness in the operative parts is a desideratum.

It is not desired that this invention be limited to use on or in connection with motorcycles, or to the number of speeds obtainable, for the device could be used with the same results upon any type of motor vehicle.

A belt drive may be easily substituted for the chain drive herein specified, therefore I do not desire to limit the invention as to the manner of power transmission.

I claim as my invention:

1. In a change speed device, the combination of a non-rotative bearing member, a primary driven member, an intermediate driven member, a driving member, means connected with the primary driven member and interposed between the intermediate driven member and the non-rotative bearing member, adapted to reduce the rotative speed of said intermediate driven member relative to the speed of the primary driven member, and means located radially exterior to the primary and intermediate driven members for locking said driving member to the periphery of either said intermediate driven member or said primary driven member.

2. In a change speed device, the combination of a non-rotative bearing member provided with external gear teeth, a primary driven member, an intermediate driven member provided with internal gear teeth, a driving member, pinions mounted on said primary driven member and adapted to mesh with the gear teeth on said non-rotative member and also to mesh with gear teeth of said intermediate driven member, and means located radially exterior to the primary and intermediate driven members for locking said driving member to the periphery of either the said intermediate or primary driven member.

3. In a change speed device, the combination of a non-rotative bearing member provided with external gear teeth, a primary driven member having bearing upon said non-rotative bearing member, an intermediate driven member, also having bearing upon said non-rotative bearing member and provided with internal gear teeth, bearing studs rigidly attached to said primary driven member, pinions mounted on said studs and meshing with the gear teeth of said non-rotative member and of said intermediate driven member, a driving member loosely mounted on said primary driven member, and means for locking said driving member either to said primary driven member or said intermediate driven member.

4. In a change speed device, the combination of a non-rotative bearing member, a primary driven member, an intermediate driven member, pinions mounted on said primary driven member and interposed between primary driven member and intermediate said non-rotative member and intermediate driven member, a driving member loosely mounted on the primary driven member, a clutch ring member having axially sliding and non-rotative engagement with said driving member, and means upon said primary and intermediate driven members and said clutch ring for locking either of said driven members to said driving member, through the shifting of said clutch ring.

5. In a change speed device, the combination of a non-rotative bearing member provided with external gear teeth, a primary driven member mounted on said bearing member, an intermediate driven member also mounted on said bearing member and provided with a cylindric rim having internal gear teeth, a driving member mounted on the primary driven member, an annular stud-bearing member rigidly attached at its outer margin to said primary driven member and provided near its inner margin with studs extending laterally from its side face, pinions mounted on said studs and meshing with the gear teeth on said bearing member and intermediate driven member, member and intermediate driven member, and means radially exterior to the primary and intermediate driven members for locking said driving member to either the intermediate or the primary driven member.

6. In a change speed device, the combination of a non-rotative bearing member provided with external gear teeth, a primary driven member mounted on said bearing member, an intermediate driven member also mounted on said bearing member and provided with a cylindric rim having internal gear teeth, said primary driven member being provided with rigidly attached, annularly arranged studs, pinions mounted on said studs and adapted to mesh with the gear teeth on the said bearing member and intermediate driven member, and locking means located radially exterior to the rim of the intermediate driven member adapted for locking said driving member either to the periphery of the primary driven member or to the periphery of the intermediate driven member.

7. In a change speed device, the combination of a non-rotative bearing member provided with external gear teeth, a primary driven member having bearing on said non-rotative member at the inner side of the gear teeth on the latter, an intermediate driven member having bearing on said non-rotative member at the outer side of said gear teeth, said intermediate driven member being provided with a cylindric rim extending inwardly over the teeth on the bearing member and provided with internal gear teeth, pinions mounted on the primary driven member and intermeshing with the gear teeth of the non-rotative member and intermediate driven member, a driving member mounted on the primary driven member and an axially shiftable clutch ring arranged radially exterior to the primary and intermediate driven members, said clutch ring having laterally sliding and non-rotative connection with said driving member and being adapted for interlocking engagement with either the primary driven member or intermediate driven member.

8. In a change speed device, the combination of a non-rotative bearing member provided with external gear teeth, a primary driven member having bearing on said non-rotative member at the inner side of the gear teeth on the latter, an intermediate driven member having bearing on said non-rotative member at the outer side of said gear teeth, said intermediate driven member being provided with a cylindric rim extending inwardly over the teeth of the bearing member and provided with internal gear teeth, pinions mounted on the primary driven member and intermeshing with the gear teeth on the non-rotative member and the intermediate driven member, a driving member mounted on the primary driven member and projecting radially beyond the peripheral surface of the same, said primary driven member being provided with an annular flange overlapping the cylindric rim of the intermediate driven member and with an exterior cylindric surface and said primary and intermediate driven members being provided with peripheral, radially extending locking teeth, and a clutch ring adapted to slide laterally on the peripheral surface of the primary driven member, said clutch ring having laterally sliding and non-rotative connection with said driving member and being adapted for locking engagement with the locking teeth on either the primary or intermediate driven members.

9. In a change speed device, the combination of a non-rotative bearing member provided with external gear teeth, a primary driven member mounted on said bearing member, an intermediate driven member also mounted on said bearing member and provided with an annular rim having internal gear teeth, a driving member mounted on the primary driven member, pinions mounted on the primary driven member and meshing with the gear teeth on the primary and intermediate driven members, said primary driven member being provided with an annular flange extending laterally over the rim of the said intermediate driven member, and means for locking the driving member to the periphery of the primary driven member or to the periphery of the intermediate driven member, comprising an axially shiftable clutch ring surrounding and sliding upon the said annular flange of the primary driven member.

10. In a change speed device, the combination of a non-rotative bearing member provided with external gear teeth, a primary driven member mounted on said bearing member, an intermediate driven member also mounted on said bearing member and provided with internal gear teeth, pinions mounted on the primary driven member and meshing with said gear teeth on the bearing member and intermediate driven member, a driving member, said primary and intermediate driven members being provided with peripheral locking teeth, and an axially shiftable annular clutch ring member arranged radially exterior to the primary and intermediate driven members and having non-rotative and laterally sliding connection with said driving member, said clutch member being adapted for locking engagement with the locking teeth of either the said primary or intermediate driven member.

11. In a change speed device, the combination of a non-rotative bearing member, provided with external gear teeth, a primary driven member mounted on said bearing member, an intermediate driven member also mounted on said bearing member and provided with internal gear teeth, pinions mounted on the primary driven member and meshing with said gear teeth on the bearing member and intermediate driven member, a driving member provided with a series of annularly arranged, laterally projecting arms surrounding the intermediate driven member, said primary and intermediate driven members being provided with peripheral locking teeth, and an axially shiftable clutch ring located radially exterior to said primary and intermediate driven members, said clutch ring being provided with keys having sliding engagement with the arms of the driving member and adapted for locking engagement with the locking teeth of either the primary or intermediate driven member.

12. In a change feed device, the combination of a non-rotative bearing member, a primary driven member mounted on said bearing member and provided with an external, cylindric surface, an intermediate driven member also mounted on said bearing member and provided with internal gear teeth, a plurality of pinions mounted on the primary driven member and meshing with the gear teeth on the bearing member and intermediate driven member, said primary and intermediate driven members being each provided upon its periphery with radially projecting locking teeth, a driving member provided with annularly arranged arms arranged radially exterior to the primary driven member, and an axially shiftable clutch ring surrounding and adapted to slide laterally on the cylindric surface of the primary driven member, said clutch ring being provided with a plurality of locking keys, said keys having laterally sliding engagement with the arms on the driven member, and being adapted for engagement with the locking teeth of either the primary or intermediate driven member.

13. In a change speed device, the combination of a non-rotative bearing member provided with external gear teeth, a primary driven member mounted on said bearing member, an intermediate driven member also mounted on said bearing member and provided with internal gear teeth, pinions mounted on the forward face of the primary driven member and meshing with the gear teeth on the bearing member and intermediate driven member, a driving member mounted on the rear face of the primary driven member and provided with a plurality of laterally extending arms arranged radially exterior to the primary and intermediate driven members, said primary and intermediate driven members being each provided with peripheral, radially extending, locking teeth, and an axially sliding clutch ring provided with a plurality of locking keys, each of which has laterally sliding engagement with the arms of the driving member, said keys being adapted for engagement either with the locking teeth of the primary driven member or the locking teeth of the intermediate driven member.

14. In a change speed device, the combination of a non-rotative bearing member provided with external gear teeth, a primary driven member, an intermediate driven member provided with a cylindric rim and with internal gear teeth, pinions mounted on the primary driven member and meshing with the gear teeth of the bearing and intermediate driven members, the said primary driven member being provided with an annular marginal flange extending over the rim of the intermediate driven member with a cylindric exterior surface and with peripheral locking teeth at the rear margin of said cylindric surface, and the intermediate driven member being provided with peripheral locking teeth located at the forward margin of its said rim, a driving member mounted on the primary driven member and provided with laterally extending arms surrounding and spaced radially from the cylindric exterior surface of the primary driven member, a laterally shiftable clutch ring mounted on the cylindric surface of the primary driven member and provided with a plurality of locking keys, said keys having sliding engagement with the arms on the driving member and being adapted for locking engagement with the teeth of either the primary driven member or of the intermediate driven member.

15. In a change speed device, the combination of a non-rotative bearing member provided with external gear teeth, a primary driven member mounted on the said bearing member, an intermediate driven member also mounted on said bearing member and provided with a cylindric rim having internal gear teeth, pinions mounted on the primary driven member and meshing with the gear teeth of the bearing member and intermediate driven member, said primary driven member having a cylindric peripheral surface and a plurality of radial locking teeth at the rear edge of said cylindric peripheral surface, and said intermediate driven member having a plurality of locking teeth arranged at the forward edge of its cylindric rim, a driving member mounted on the primary driven member and provided with laterally extending arms surrounding and spaced radially from said cylindric surface of the primary driven member, a clutch ring consisting of two annular members, one of which is adapted to slide upon the cylindric, peripheral surface of the primary driven member between said surface and the arms on the driving member, and the other of which surrounds said arms, and keys carried by said clutch ring and engaging the arms on the driving member, said keys being adapted for engagement with the locking teeth on either the primary or intermediate driven members.

16. In a change speed device, the combination of a non-rotative bearing member, a primary driven member, an intermediate driven member, a driving member provided with laterally extending arms located radially exterior to the primary and intermediate driven members, an axially shiftable clutch ring comprising an inner ring located inside of said arms and an outer ring located exterior to said arms, and keys interposed between said annular members and adapted for locking engagement at their ends with the locking teeth on either the primary driven member or intermediate driven member, said annular members of the clutch ring and keys being rigidly connected by rivets passing through the said annular members and each of said keys.

17. In a change speed device, the combination of a non-rotative bearing member provided with external gear teeth, a primary driven member, an intermediate driven member provided with internal gear teeth, pinions mounted on the primary driven member and meshing with the gear teeth of the bearing and intermediate driven members, a driving member provided with laterally extending arms which are spaced radially from the periphery of the primary driven member, a clutch ring consisting of two annular members, one of which is interposed between the periphery of the primary driven member and the laterally extending arms of the driving member and the other of which is located exterior to the said arms, said clutch ring being adapted for locking engagement with either the primary or intermediate driven member, and non-rotative means engaging the outer annular member of said clutch ring for giving shifting movement to the latter.

18. In a change speed device, the combination of a non-rotative bearing member provided with external gear teeth, a primary driven member, an intermediate driven member provided with internal gear teeth, pinions mounted on the primary driven member and meshing with the gear teeth of the bearing and intermediate driven members, a driving member provided with laterally extending arms which are spaced radially from the periphery of the primary driven member, a clutch ring consisting of two annular members, one of which is interposed between the periphery of the primary driven member and the laterally extending arms of the driving member, and the other of which is located exterior to the said arms, said clutch ring being adapted for locking engagement with either the primary or intermediate driven member, and means for giving shifting movement to the said clutch ring, comprising blocks engaging the said annular outer member of the clutch ring, a pivoted yoke carrying said blocks, and manually operable means for giving shifting movement to said yoke.

19. In a change speed device, the combination of a non-rotative bearing member provided with external gear teeth, a primary driven member, an intermediate driven member provided with internal gear teeth, pinions mounted on the primary driven member and meshing with the gear teeth of the bearing member and intermediate driven member, a driving member, means for locking said driving member either to the primary driven member or to the intermediate driven member, embracing a clutch ring surrounding said primary and intermediate driven members, and means for giving shifting movement to the said clutch ring, comprising blocks engaging the said clutch ring, a pivoted yoke carrying said blocks, a pivoted shaft carrying said yoke, a lever attached to one extremity of said pivoted shaft, an auxiliary lever pivoted to the other extremity of said lever and having angularly arranged arms of unequal length, the shorter of which turns on a fixed pivot, and a control rod pivoted to the longer arm of said auxiliary lever.

20. In a change speed device, the combination of a non-rotative bearing member provided with external gear teeth, a primary driven member having bearing on said non-rotative bearing member inside of the gear teeth on the latter, an intermediate driven member provided with internal gear teeth and having bearing on the outer end of said non-rotative bearing member, a driving member mounted on the said primary driven member, pinions mounted on said primary driven member and adapted to mesh with the gear teeth on said non-rotative member and also to mesh with gear teeth of said intermediate driven member, means located radially exterior to the primary and intermediate driven members for locking said driving member either to said intermediate driven member or to said primary driven member, and a casing attached to the outer end of the non-rotative bearing member, and extending over and around the intermediate driven member and the locking means, and having its inner margin adjacent to the outer face of the driving member.

21. In a change speed device, the combination of a non-rotative bearing member provided with external gear teeth, a primary driven member having bearing on said non-rotative bearing member inside of the gear teeth on the latter, an intermediate driven member provided with internal gear teeth and having bearing on the outer end of said non-rotative bearing member, a driving member mounted on the said primary driven member, pinions mounted on the said primary driven member and adapted to mesh with the gear teeth on said non-rotative member and also to mesh with gear teeth of said intermediate driven member, means located radially exterior to the primary and intermediate driven members for locking said driving member either to said intermediate driven member or to said primary driven member, and a casing attached to the outer end of the non-rotative bearing member and extending over and around the intermediate driven member and the locking means, and having its inner margin adjacent to the outer face of the driving member, the said inner margin of the casing and the driving member being provided with dust rings.

In testimony, that I, claim the foregoing as my invention I affix my signature in the presence of two witnesses, this 16th day of August, A. D. 1912.

FRANK E. SPERRY.

Witnesses:
G. P. SHAMBO,
ARTHUR N. LUNGREN.